June 20, 1950 A. J. KERCHER 2,512,529
THERMOSTATIC SWITCH
Filed May 12, 1947 2 Sheets-Sheet 1
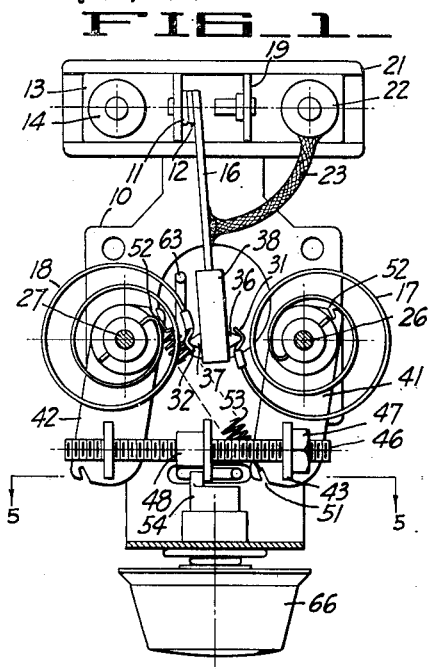
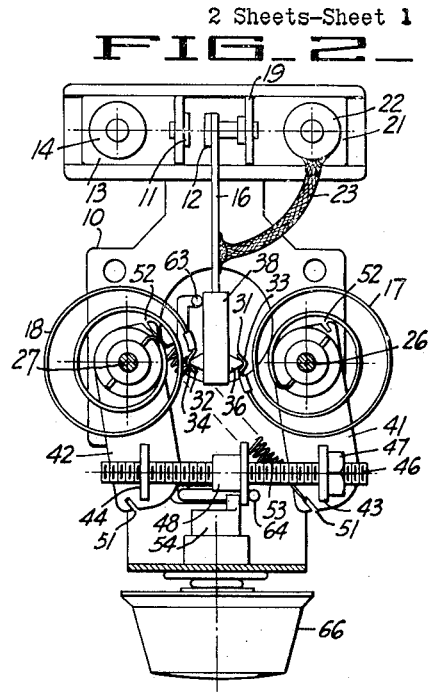
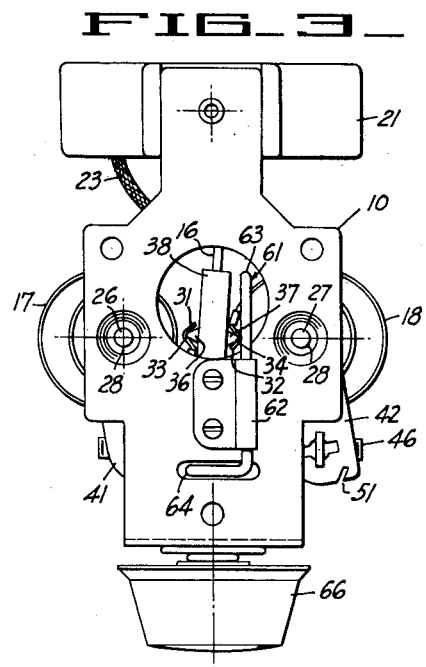
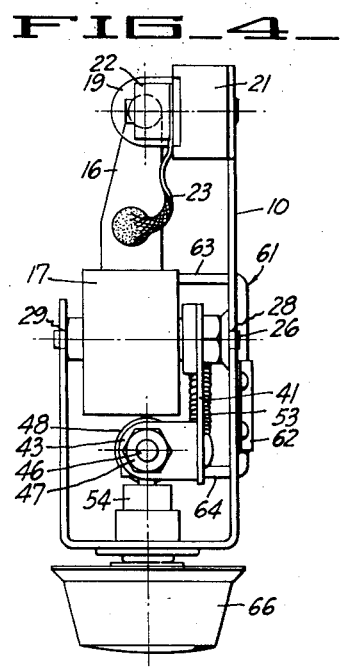
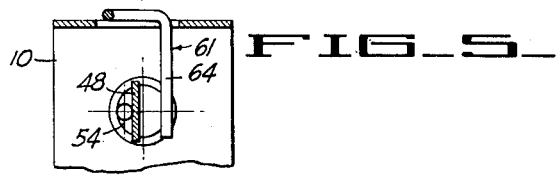
INVENTOR
Arthur J. Kercher
BY
Paul D. Flehr
ATTORNEY June 20, 1950　　　　A. J. KERCHER　　　　2,512,529
THERMOSTATIC SWITCH
Filed May 12, 1947　　　　　　　　　　　　2 Sheets-Sheet 2
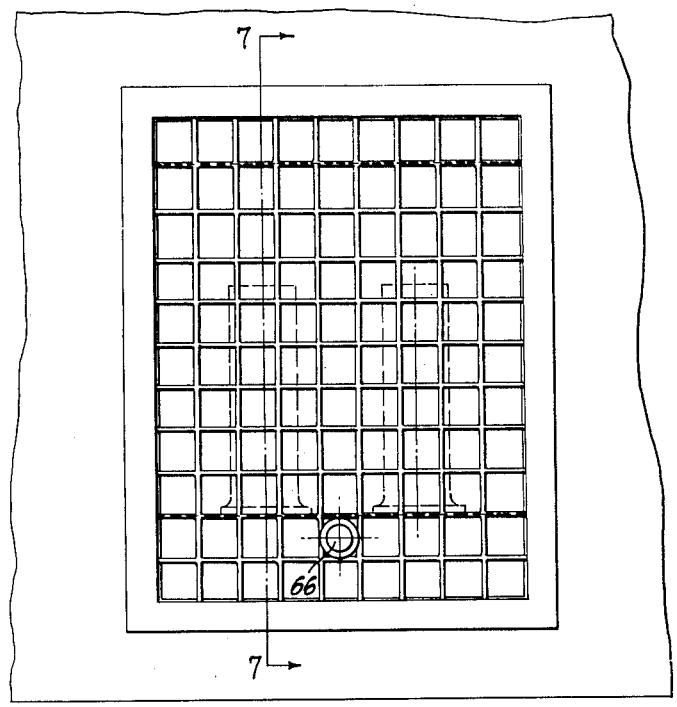
FIG_6_
FIG_7_
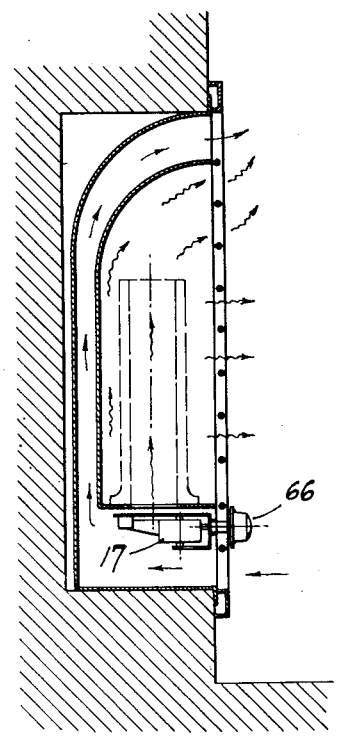
INVENTOR.
Arthur J. Kercher
BY
ATTORNEY Patented June 20, 1950

2,512,529

UNITED STATES PATENT OFFICE 2,512,529

THERMOSTATIC SWITCH

Arthur J. Kercher, Berkeley, Calif., assignor of one-half to William Wesley Hicks, San Francisco, Calif.

Application May 12, 1947, Serial No. 747,497

1 Claim. (Cl. 219—38)

This invention relates generally to thermostats for effecting control of an electrical circuit in accordance with temperature changes in a given medium, in this particular instance, the medium being air. It has particular application to devices of this character for use in conventional electric space heaters.

In thermostats of the above character, it has been common to utilize a thermally responsive element, as for example a bimetallic strip, which will flex in accordance with temperature changes, connected to a movable electrical contact in such a manner as to move the contact in a full open or closed position with respect to a stationary contact and thereby either open or close an electrical circuit.

The chief defect of most devices of the prior type has been that the same has not been quick or snap acting whereupon sparking has resulted between the contact and improper control of the circuit has prevailed.

It is a general object of the present invention to provide a thermostat which will be characterized by positive opening and closing and which will be relatively sensitive in its operation.

In the past, in connection with electrical circuits in which such thermostats have been employed, it has been customary to incorporate an electrical switch in the circuit. The incorporation of such a switch in an electrical system has increased the cost of electrical heaters and made necessary further engineering in connection with their construction.

It is an object of the present invention to provide a thermostat of the above character in which there will be incorporated means for retaining the movable contact of the thermostat in such a position that the circuit will remain open and cannot be closed by operation of the thermally responsive elements.

Further objects of the invention will appear from the following description in which the preferred embodiment of the invention has been set forth in detail in conjunction with the accompanying drawings.

Referring to the drawings:

Figure 1 is a plan view illustrating a thermostat constructed in accordance with the present invention showing the movable contact in closed position with respect to the stationary contact.

Figure 2 is a plan view illustrating a thermostat constructed in accordance with the present invention and showing the movable contact in open position with respect to the cooperating stationary contact.

Figure 3 is a rear elevational view of the thermostat shown in Figure 1.

Figure 4 is a side elevational view of the thermostat shown in Figure 1.

Figure 5 is a fragmentary cross-sectional detail taken along the line 5—5 of Figure 1.

Figure 6 is a front elevation of an electric heater in which my thermostatic switch has been incorporated.

Figure 7 is a cross-sectional elevation taken along the line 7—7 of Figure 6.

As shown in the drawings, the device consists of a suitable mounting 10 which can conveniently be in the form of a relatively rigid metal plate 10 which may be made in a general U shape as shown in Figure 4. As the device, as shown, is adapted to control an electrical circuit, I have shown a pair of cooperating electrical contacts 11 and 12. The stationary contact 11 is carried by a suitable conductor 13 which in turn is provided with a post 14 by means of which it may be placed in communication with a suitable electrical circuit. The movable contact 12 is carried by one end of a lever arm 16, which in turn is connected to temperature responsive elements 17 and 18, to be presently described.

In order to limit movement of contact 12 in open position, a stop in the form of an upstanding member 19 is provided. Members 13 and 19 are mounted upon a base 21 of non-conducting material which in turn is mounted upon base portion 10 substantially as shown. Since members 13 and 19 are spaced apart upon non-conducting member 21 they are not in direct electrical contact with each other. Member 19 is provided with a post 22 to which suitable connections may be made to an electrical circuit. A flexible conductor 23 communicates between post 22 and the lever arm 16 whereby post 22 and movable contact 12 are in constant electrical communication. As has previously been pointed out stationary contact 12 and post 14 are likewise in constant electrical communication. Therefore, when movable contact 12 and stationary contact 11 are in contact, an electrical circuit is closed. When movable contact 12 and stationary contact 11 are not in contact, the circuit is open.

Thermal responsive elements 17 and 18 are preferably in the form of bimetallic strips which tend to flex in response to temperature changes. Strips of this character are well known in the art and are generally formed of layers of material having different temperature coefficients of expansion. In this instance these strips are preferably formed spirally as shown. One end of strips 17 and 18 is mounted upon similar axles 26 and 27 which are rotatably mounted in suitable openings 28 and 29, in base 10.

The ends of strips 17 and 18 remote from axles 26 and 27 are arranged so as to be in spaced relationship. The bimetallic layers of these elements are preferably arranged so that each strip tends to uncoil in response to an increase in temperature, and since the elements 17 and 18 are coiled in opposite directions, their ends 31 and 32 likewise move in opposite directions responsive to changes in temperature. Ends 31 and 32 are provided with transverse grooves 33 and 34 which cooperate with ridges 36 and 37 upon a toggle member 38. Member 38 is formed of nonconducting material and entirely surrounds the lower end of lever 16 and is rigidly connected therewith, whereby any motion transmitted to member 38 will be transmitted to lever 16. Member 38 is retained in grooves 33 and 34 by frictional engagement therewith.

I have provided means in combination with the foregoing, to adjust the device for effecting a control over a wide range of temperatures. This is done by rotating the axles 26 and 27 and changing or adjusting the position of ends 31 and 32 of strips 17 and 18 with respect to the base 10. Thus, axles 26 and 27 are provided with lever arms 41 and 42. The ends of levers 41 and 42 remote from axles 26 and 27 are provided with identical projecting portions 43 and 44 which are rotatably mounted with respect thereto. A threaded member 46 cooperates with both said members 43 and 44 and maintains the same in predetermined spaced relationship. A nut 47 is provided upon member 46 and abuts against member 43 thereby preventing rotation of member 46 once the spaced relationship between members 43 and 44 has been determined. Intermediate members 43 and 44 on the threaded member 46 there is a flanged member 48, whose purpose will hereinafter be described. It is apparent that upon movement of flanged member 48 in one direction or another, similar movement of arms 41 and 42 occurs thereby rotating axles 26 and 27 as has previously been described, to adjust the device for effecting control at any point over the range of temperatures.

The arms 41 and 42 are provided with similar notches 51 and 52 and, as shown in Figures 1 and 2 a coil spring 53 engages notch 51 in arm 41 and notch 52 in arm 42 thereby urging the same to the positions generally as shown in Figure 1, the position at which a higher temperature is required to open the circuit, or, in other words, to snap contact 12 away from contact 11. To oppose the normal biasing of spring 53 I have provided a crank member 54, as shown, which engages the flanged member 48. Upon rotation of crank member 54, the flanged member and threaded member 46 are urged to the right as shown in Figure 2 thereby overcoming the bias of spring 53 and urging arms 41 and 42 to the position shown in Figure 2. It will be appreciated that rotation of crank 54 may be halted at any point between the extremes shown in Figures 1 and 2 thereby effecting a control at any point over the range of temperatures provided between the positions of the temperature responsive elements shown in Figures 1 and 2.

As has previously been pointed out I desire to provide a device for locking the movable contact 12 in open position. I have provided a member 61 which is movably mounted upon base 10 generally as shown in Figures 3 and 4 by means of a grooved plate 62. Member 61 is provided with arms 63 and 64. As is shown in Figures 1 and 2 arm 64 is adapted to be engaged by flanged member 48. When the flanged member 48 is urged to the position shown in Figure 2, by means of rotation of crank 54, this motion is transmitted to arm 63 which engages the body 38, as is likewise shown in Figure 2. When the arm 63 engages the body 38 as shown in Figure 2 it is obvious that the contact 12 will be urged into cooperative relationship with the contact 11 by pressure of the temperature responsive elements 17 and 18 when the pressure exerted by the same is sufficient to overcome the pressure of arm 63. I have so constructed the device that, when the arm 63 is urged to the position as shown in Figure 2 no change in temperature would be sufficient to operate members 17 and 18 to overcome the pressure of member 63. In this manner the device is locked against operation and the circuit is kept open, regardless of temperature variations. It will be obvious therefore that this lock-out device obviates the necessity of the insertion of a switch at any other point in the circuit, and that the handle 66, which operates the crank 54, operates as both a means effecting the control of the device over a substantial range of temperatures and also as a means of effecting a lock-out for effectively retaining contact 12 in open position.

When the device is in operation the member 38 is subjected to a turning torque to rotate the same in one direction or the other depending upon the temperature of the bimetallic strips 17 and 18 and upon the position of the flanged member 48. The turning torque is created by the tendency of ends 31 and 32 to move in opposite directions in response to changes of temperature in the strips 17 and 18. A toggle effect which makes positive movement of contact 12 is produced by virtue of the normally sprung condition of the bimetallic strips 17 and 18 whereby the ends 31 and 32 in grooves 33 and 34 are normally biased together upon the ridges 36 and 37. For a given setting of the flanged member 48, a certain temperature variation is required to effect movement of contact 12 from open to closed position or vice versa. Assuming now for a given adjustment of the device that the temperature of elements 17 and 18 is midway between certain upper and lower limits, contact 12 will remain in either open or closed position. Furthermore for such conditions the member 38 will move to a dead center position when the contacts are open or closed. Therefore as the temperature varies between such limits, contact 12 is caused to move rapidly to either closed or open position and the rapidity of movement is caused by upsetting the toggle formed by member 38. If for one setting of the member 48, the contacts will close at a given temperature, resetting member 48 to change the angular position of arms 41 and 42 with respect to the member 38, will require a different temperature of strips 17 and 18 to close the contacts. Thus, by varying the setting of the member 48, the contacts can be caused to close for any desired temperature over a substantial range.

As shown in Figures 6 and 7 my thermostatic switch is adapted to be placed in an electric air heater, for example, of the type shown in United States Letters Patent 1,704,479. It will be noted that in this installation the switch is adapted to be placed in the incoming air stream before the air is heated by the heater. Heaters of this type are adapted to be mounted either in the wall, near the floor, or, in the case of portable heaters, are adapted to be placed fairly close to the floor. Cold air is drawn in from the floor and passes over my thermostatic switch before being acted upon by the heating elements. When the cold air drawn in from the floor reaches a predetermined temperature sufficient to operate members 17 and 18, the switch will be actuated and the circuit broken. As has previously been described rotation of handle 66 operates crank 54 and effects the control of the thermostatic switch over a substantial range of temperatures and also effects a lock-out for effectively retaining contact 12 in open position. When the device acts as a lock-out the circuit is kept open regardless of the temperature of the cold air passing over the temperature responsive elements 17 and 18. However when the device does not effect a lockout by retaining contact 12 in open position, the device may be actuated by the effect of the air passing over the strips 17 and 18 as has previously been described.

I claim:

In an electric heater, an electrical heating element for producing heat by convection currents of air and means for controlling said element in accordance with the temperature of the air that is to be acted upon by the heating element, said means comprising a thermostatic switch having a stationary contact and a cooperating contact movable to open and closed position relative to the stationary contact, said cooperating contact adapted to be actuated by a pair of temperature responsive strips in the air stream of the air that is to be acted upon by the heater, means associated with said strips to determine the temperature at which they actuate said movable contact, a handle for positioning said means, and a lockout means adapted to prevent movement of said movable contact from full open position, said lockout means also being adapted to be operated by said handle for positioning said means to determine the temperature at which said strips actuate said movable contact.

ARTHUR J. KERCHER.

REFERENCES CITED

The following references are of record in the file of this patent:

UNITED STATES PATENTS

| Number | Name | Date |
|---|---|---|
| 1,704,479 | Kercher et al. | Mar. 5, 1929 |
| 1,839,935 | Thomas | Jan. 5, 1932 |